US012401915B2

(12) United States Patent
Sassenrath et al.

(10) Patent No.: US 12,401,915 B2
(45) Date of Patent: Aug. 26, 2025

(54) CAMERA TIME-BASED MOTION TRAILS AND MOTION HEAT-MAPS FOR PERIODIC CAPTURED IMAGES

(71) Applicant: ROKU, INC., San Jose, CA (US)

(72) Inventors: Carl Sassenrath, Ukiah, CA (US); David Stern, Los Gatos, CA (US); Gregory Garner, Key Colony Beach, FL (US); Patrick Brouillette, Tempe, AZ (US)

(73) Assignee: Roku, Inc., San Jose, CA (US)

( * ) Notice: Subject to any disclaimer, the term of this patent is extended or adjusted under 35 U.S.C. 154(b) by 41 days.

(21) Appl. No.: 18/486,464

(22) Filed: Oct. 13, 2023

(65) Prior Publication Data

US 2025/0126367 A1 Apr. 17, 2025

(51) Int. Cl.
| | |
|---|---|
| *H04N 23/80* | (2023.01) |
| *G06T 7/246* | (2017.01) |
| *G06V 20/40* | (2022.01) |
| *G06V 20/52* | (2022.01) |
| *H04N 5/262* | (2006.01) |
| *H04N 7/18* | (2006.01) |

(52) U.S. Cl.
CPC ............ *H04N 23/80* (2023.01); *G06T 7/248* (2017.01); *G06V 20/41* (2022.01); *G06V 20/52* (2022.01); *H04N 5/2624* (2013.01); *H04N 7/183* (2013.01); *G06T 2207/10016* (2013.01); *G06T 2207/20212* (2013.01); *G06T 2207/30232* (2013.01)

(58) Field of Classification Search
CPC ...... H04N 23/80; H04N 5/2624; H04N 7/183; G06T 7/248; G06T 2207/10016; G06T 2207/20212; G06T 2207/30232; G06V 20/41; G06V 20/52
See application file for complete search history.

(56) References Cited

U.S. PATENT DOCUMENTS

| | | | | |
|---|---|---|---|---|
| 10,643,659 | B1 * | 5/2020 | Hay | G06T 7/262 |
| 11,232,591 | B1 * | 1/2022 | Twigg | G06F 3/012 |
| 2004/0017504 | A1 | 1/2004 | Prandoni et al. | |
| 2008/0211908 | A1 * | 9/2008 | Dvir | G08B 13/19604 |
| | | | | 348/E5.065 |
| 2009/0262218 | A1 | 10/2009 | Makii | |
| 2010/0172641 | A1 | 7/2010 | Sasaki et al. | |
| 2013/0130843 | A1 * | 5/2013 | Burroughs | H01Q 1/273 |
| | | | | 473/415 |

(Continued)

*Primary Examiner* — Chiawei Chen
(74) *Attorney, Agent, or Firm* — Sterne, Kessler, Goldstein & Fox P.L.L.C.

(57) ABSTRACT

Disclosed herein are system, method and/or computer program product embodiments, and/or combinations and subcombinations thereof, for generating a long exposure composite image (LECI) frame, wherein the LECI frame provides a summary of activity in a monitored environment over a duration of time. An embodiment captures, using an image-capturing device, a sequence of image frames over the duration of time using an optical sensor of the image-capturing device. The embodiment then generates the LECI frame, using an embedded low-power processor coupled to the optical sensor and dedicated to generating LECI frames, by combining the sequence of image frames. The embodiment then transmits the LECI frame to a network device using a transceiver coupled to the low-power processor.

20 Claims, 9 Drawing Sheets

(56) References Cited

U.S. PATENT DOCUMENTS

| | | | |
|---|---|---|---|
| 2015/0278608 A1* | 10/2015 | Matsumoto | G06V 40/23 |
| | | | 348/143 |
| 2017/0330330 A1* | 11/2017 | Seki | G06T 7/254 |
| 2019/0258866 A1* | 8/2019 | Khadloya | G08B 13/19695 |
| 2019/0294889 A1* | 9/2019 | Sriram | G06V 10/7625 |
| 2019/0311534 A1* | 10/2019 | Shore | G01V 5/271 |
| 2019/0366189 A1* | 12/2019 | Plant | G06F 18/22 |
| 2020/0226361 A1* | 7/2020 | Murray | G06V 40/103 |
| 2022/0036635 A1* | 2/2022 | Li | G06T 15/20 |
| 2024/0388773 A1* | 11/2024 | Pilgrim | H04N 23/11 |

\* cited by examiner

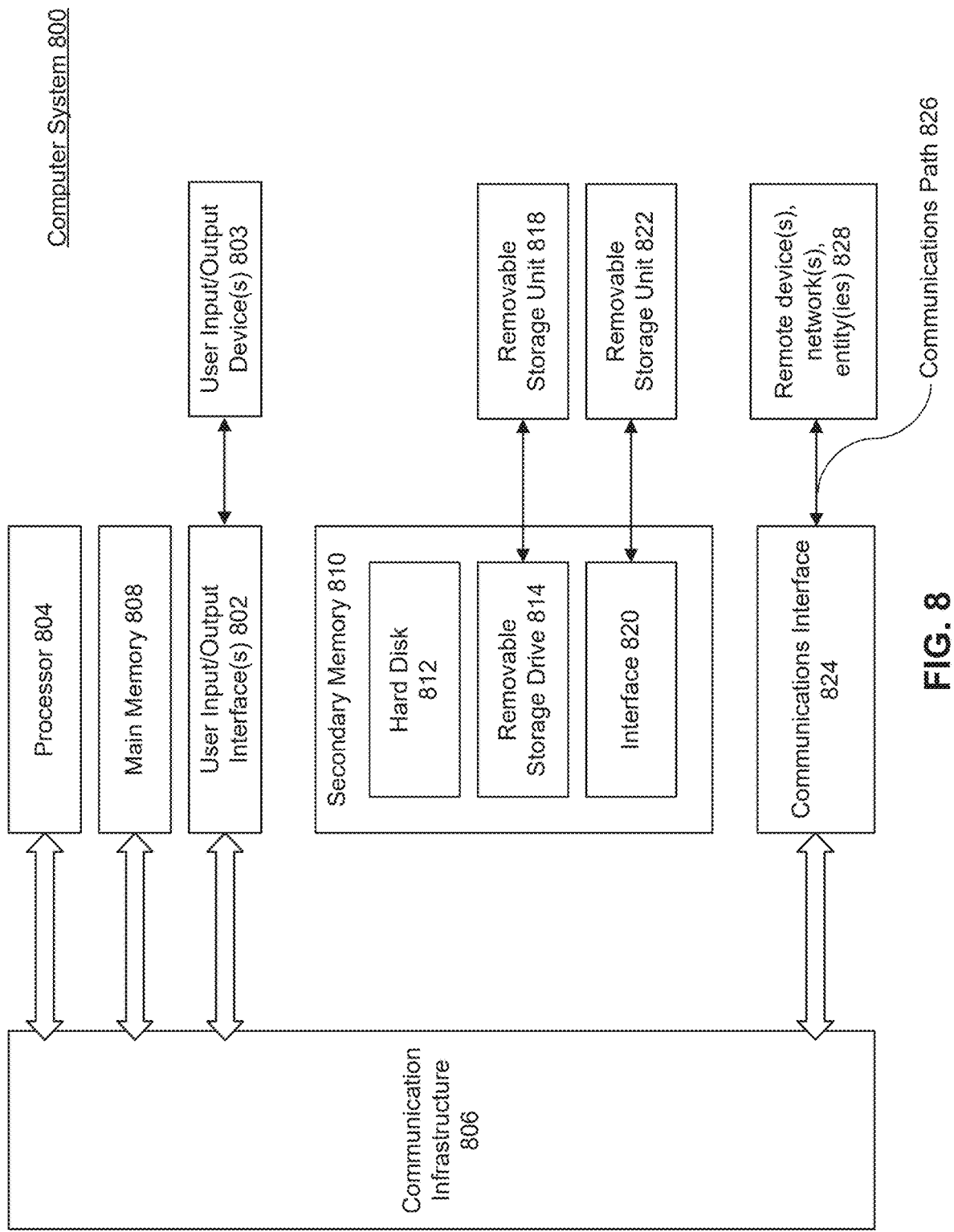

CAMERA TIME-BASED MOTION TRAILS AND MOTION HEAT-MAPS FOR PERIODIC CAPTURED IMAGES

BACKGROUND

Field

This disclosure is generally directed to image processing, and more particularly to generating a composite image that represents a visual summary of captured images and that may include camera time-based motion trails and heat-maps based on the captured images.

SUMMARY

Provided herein are system, apparatus, article of manufacture, method and/or computer program product embodiments, and/or combinations and sub-combinations thereof, for generating long exposure composite image (LECI) frames, where the LECI frames provide a single-image visual summary of activity in a monitored environment over a duration of time.

Some aspects of this disclosure relate to a method for generating a LECI frame. According to some aspects, the method includes capturing a sequence of image frames of view of a monitored environment over the duration of time using an optical sensor of the image-capturing device. In some aspects, this step may be performed by enabling the optical sensor to be always recording the monitored environment. The method further includes generating the LECI frame using an embedded low-power processor coupled to the optical sensor and dedicated to generating LECI frames by combining the sequence of image frames. The embedded low-power processor may be configured to operate separately from a main processor of the image-capturing device and may even be configured to operate if the main processor is in a sleep or low-power mode. The generated LECI frame may then be transmitted to a network device using a transceiver coupled to the embedded low-power processor.

According to some aspects, image frames within the sequence of image frames may be weighted based on the time period in which the image frames were captured. For example, the sequence of image frames includes a first set of image frames and a second set of image frames, where the first set of image frames is associated with a first time period within the duration of time and the second set of image frames are associated with a different time period within the duration of time. The first time period is more recent than the second time period, and generating the composite image frame may include performing weighted averaging on the image frames within the sequence. Weighted averaging may include, for example, assigning a first set of weights to the first set of image frames of the sequence of image frames and a second set of weights to the second set of image frames, where the first set of weights is greater than the second set of weights.

According to some aspects, the method further includes generating the LECI frame by combining the sequence of image frames by computing a pixel-wise weighted average of pixel values across the sequence of image frames based on the first and second set of weights. According to some aspects, the method further includes generating the LECI by performing image detection on one or more image frames. Image detection may be used, for example, to identify a moving object in one or more image frames of the sequence of image frames, and performing the weighted averaging by assigning higher weights to the pixels corresponding to the moving object in the one or more image frames. According to some aspects, the method further includes generating the LECI frame by identifying the relative displacement of one or more pixels between a set of image frames of the sequence of image frames to generate one or more annotations in the LECI frame. Some examples of annotations include direction vectors, such as arrows, indicating the direction of motion of an object in the sequence of image frames and heat maps indicating the length of time that an object stayed in a particular location in the monitored environment.

According to some aspects, the method further includes capturing the sequences of image frames at a capture rate that is proportional to a measure of activity in the monitored environment. According to some aspects, the duration of time is inversely proportional to a measure of activity in the monitored environment. According to some aspects, the duration of time is inversely proportional to a measure of activity in the monitored environment.

BRIEF DESCRIPTION OF THE FIGURES

The accompanying drawings are incorporated herein and form a part of the specification.

FIG. 8 illustrates an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for generating long exposure composite image (LECI) frames, where a LECI provides a single-image visual summary of activity that occurred over a duration of time. For example, aspects herein describe capturing a sequence of image frames at a low frame rate and generating a LECI frame by combining the sequence of image frames.

Surveillance cameras capture and process images and video on limited battery power over extended periods. Maximizing the battery life of such surveillance cameras is crucial for their effectiveness and longevity. Cameras operating at a low frame rate generally consume less power and generate less data, leading to reduced storage costs. However, lower frame rates may result in choppier video, especially for fast-moving subjects. Hence, the frame rate of a surveillance camera involves a tradeoff between capturing smooth video and conserving power and storage resources.

Furthermore, reviewing recorded video from a surveillance camera over extended periods can be challenging. Using tools such as increased playback speed, timestamped logs, and motion detection alerts may not be the most efficient video reviewing approaches, especially when the goal is to quickly identify relevant events while minimizing time spent on irrelevant footage.

Aspects of this disclosure describe an efficient way to summarize activity that has occurred over a duration of time in a monitored environment. According to some aspects, LECI frames are generated using a sequence of image frames captured over a duration of time. Each LECI frame summarizes activity that has occurred over a duration of time in a monitored environment using a single-image, resulting in reduced bandwidth and storage demands. According to some aspects, a LECI frame is generated by combining a sequence of image frames by computing a pixel-wise weighted average of pixel values across the sequence of image frames.

Figure 1:
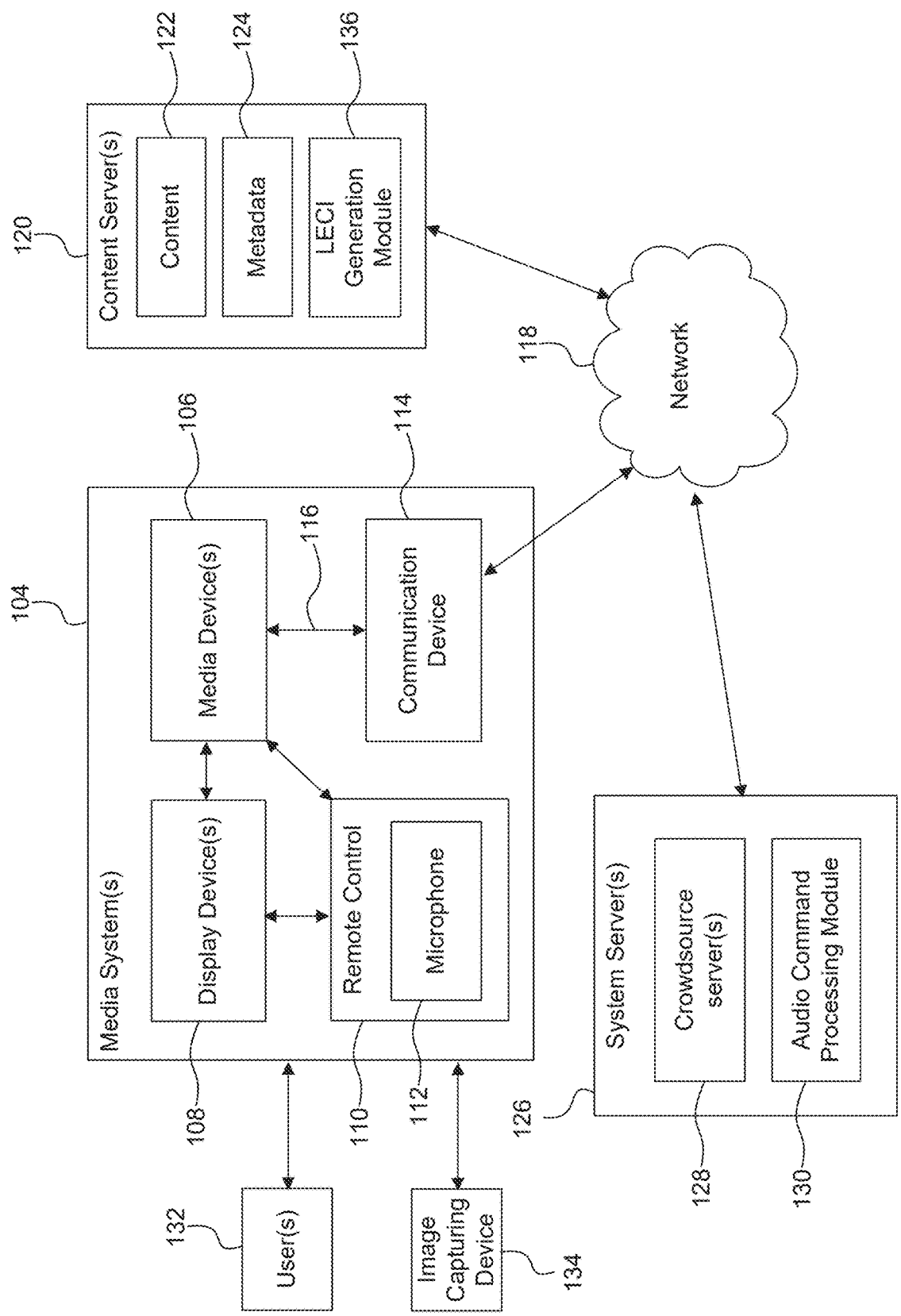
FIG. 1 illustrates a block diagram of a multimedia environment, according to some embodiments.

Various aspects of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108. In some embodiments, image capturing device 134 may be operatively coupled to, and/or connected to media system 104 and communicate to content server(s) 120 and/or system server(s) 126 via media system 104. In some aspects, image-capturing device 134 may communicate directly with content server(s) 120 and/or system server(s) 126 without needing to communicate via media system 104.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing.

Figure 2:
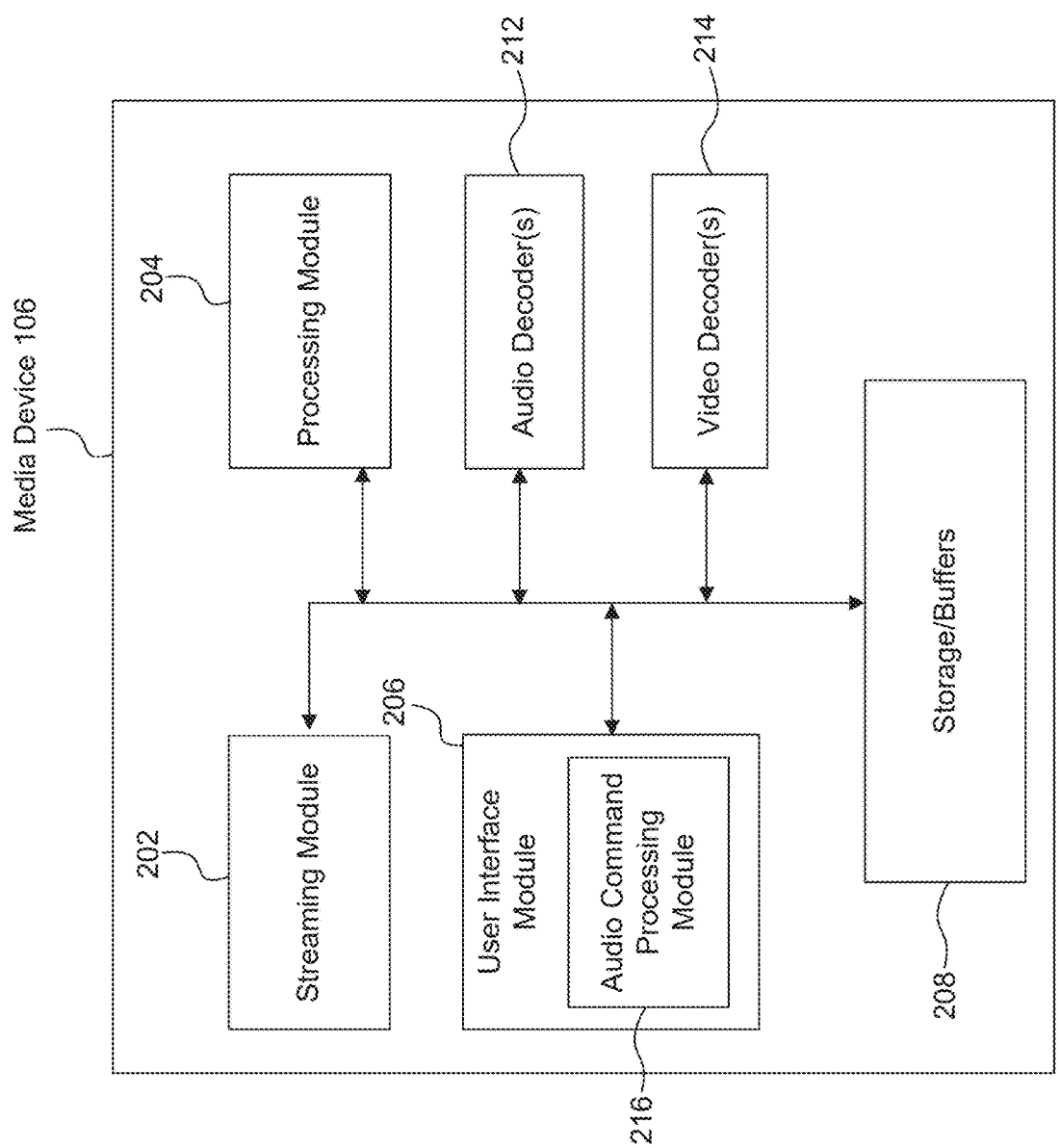
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Streaming module 202 of media device 106 may be configured to receive image information from image capturing device 134. In some aspects, the image information may comprise LECI frame generated by a low-power processor of the image-capturing device 134. In some aspects, the image information may comprise a sequence of image frames recorded by the image-capturing device 134 and an indication (e.g., a flag, a bit in a header of a packet) that the media device 106 can generate a LECI frame from the provided image information. For example, processing module 204 may receive the sequence of image frames from image capturing device 134 and generate a LECI frame from the provided sequence. In this manner, image-capturing device 134 may offload LECI processing to the media device 106. For example, image-capturing device 134 may determine it lacks sufficient processing power or electrical power (e.g., a low battery) to generate LECI frames and, instead, transmits the recorded sequence of image frames to media device 106.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In some aspects, media device 106 may display an interface for interacting with the sequence of image frames provided by image capturing device 134. For example, the interface may display selectable options for generating LECI frames based on the sequence of image frames. One example of a selectable option is the duration of time (e.g., 1 minute, 5 minutes) of the sequence of images for which to generate the LECI images. Another example includes the types of annotations or effects (e.g., arrows, heat maps, highlighting, blurring) to be added to the LECI to represent actions or objects detected within the frames of the sequence of frames.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Generating Long Exposure Composite Image Frames

Figure 3:
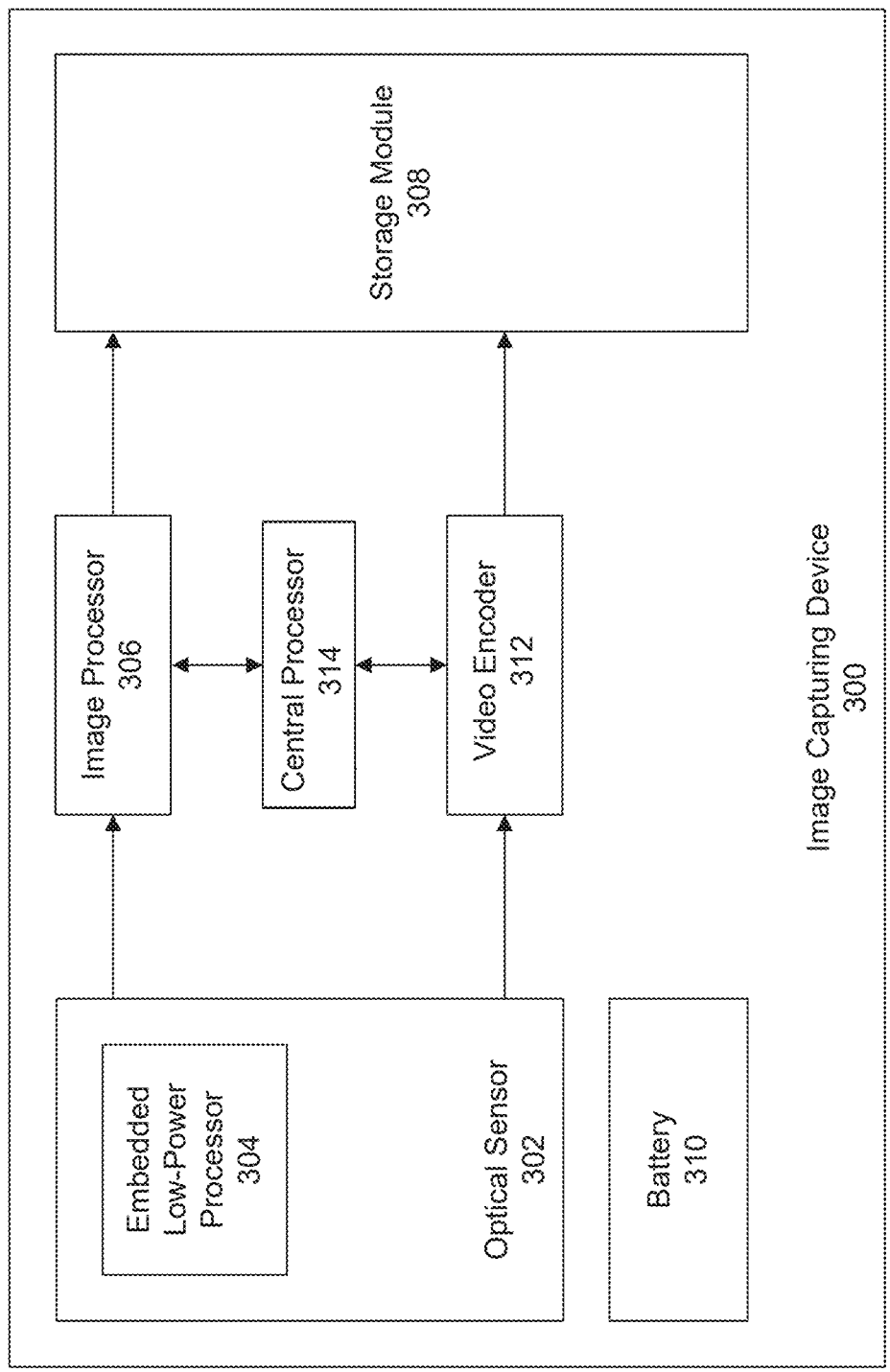
FIG. 3 illustrates a block diagram of an example image-capturing device for generating long exposure composite image (LECI) frames, according to some embodiments.

FIG. 3 illustrates a block diagram of an example image-capturing device 300 for generating long exposure composite image (LECI) frames, according to some aspects of this disclosure. According to some aspects, image-capturing device 300 (which can be image-capturing device 134 of FIG. 1) may be configured to communicate with media system 104, content server(s) 120, or system server(s) 126 in multimedia environment 102 of FIG. 1. According to some aspects, image-capturing device 300 may be a security camera, closed-circuit television camera, digital camera, smartphone, webcam, camcorder, medical imaging devices, and thermal cameras, to name just some examples.

In the illustrated example, image-capturing device 300 includes an optical sensor 302, an image processor 306, a video encoder 312, central processor 314, a storage module 308, battery module 310, and a transceiver. Optical sensor 302 may include an embedded low-power processor 304 dedicated to generating LECIs.

According to some aspects, optical sensor 302 may be configured to capture images and/or video of a monitored environment. Optical sensor 302 may have two components: a light-sensitive pixel array that converts photons to electric charges and a read-out logic that converts charges to digital values (i.e., raw image pixels). According to some aspects, optical sensor 302 may be a charge-coupled device (CCD) sensor that uses an arrangement of capacitors to move the electrical charges from pixel to pixel until they are read out from the sensor. Alternatively, optical sensor 302 may be a complementary metal-oxide semiconductor (CMOS) sensor that uses transistors at each pixel location to amplify and read out the electrical charges.

According to some aspects, optical sensor 302 generates uncompressed raw pixel data corresponding to a captured image and/or video. According to some aspects, optical sensor 302 may capture color information by using a pattern of red, green, and blue (RGB) filters over the pixels. According to some aspects, optical sensor 302 may capture luminance (Y) and chrominance (UV) components of the pixels. The uncompressed raw pixel data generated by the optical sensor 302 may then be processed by the embedded low-power processor 304 and/or image processor 306 of the image-capturing device 300.

According to some aspects, embedded low-power processor 304 is a specialized integrated circuit designed to provide processing capability for specific tasks (e.g., computing the weighted average of a set of image frames) so as to conserve power consumption by image-capturing device 300. Embedded low-power processor 304 may minimize power consumption through a combination of architectural design and power management techniques. For example, embedded low-power processor 304 may use energy-efficient microarchitectures to reduce power consumption. Furthermore, embedded low-power processor 304 may operate at a lower clock speed and voltage compared to the main processor (i.e., image processor 306) of the image-capturing device 300, and the slower clock speeds and reduced voltage levels result in lower power consumption.

According to some aspects, raw image and/or video pixels are transferred from the optical sensor 302 (e.g., via a camera serial interface) to image processor 306. Image processor 306 may perform image compression by generating quantized pixels. Furthermore, image processor 306 may also perform noise reduction, color correction, gamma correction, and other enhancements to improve the overall quality of the image.

According to some aspects, operations performed by the image processor 306 may consume substantial amount of battery power. Therefore, embedded low-power processor 304 may be configured to operate when image-capturing device 300 is in a power state for conserving power consumption (e.g., low power or sleep state). Operations (e.g., generating a LECI frame) of embedded low-power processor 304 are configured to be substantially power-efficient compared to operations using the main processor (i.e., image processor 306). To reduce power consumption, image processor 306 may implement sleep cycles. A sleep cycle may be designed to reduce power consumption during periods of inactivity while still allowing the sensor to quickly resume normal operation when needed.

According to some aspects, the video encoder 312 takes raw video data from optical sensor 302 and converts it into a digital format that can be stored or transmitted over a network. Video encoder 312 may be embedded on a system on chip (SoC) of image capturing device 300. According to some aspects, video encoder 312 may use video compression algorithms to reduce the size of the video data. Common video compression standards include H.264, H.265 (high efficiency video coding (HEVC)), and VP9. According to some aspects, to reduce power consumption, instead of central processor 314, video encoder 312 may be configured to generate motion vectors from a sequence of image frames of the input video data. In other words, video encoder 312 may be configured to perform frame-by-frame comparison when compressing the video. Video encoder 312 provides image capturing device 300 low-power hardware acceleration because the generation of motion vectors is off-loaded to the video encoder 312. Motion vectors may be used to describe how objects in a video move from one frame to another. The output of video encoder 312 may be a compressed video bitstream. Central processor 314 may scan the generated bitstream for the motion vectors created by video encoder 312. In some aspects, video encoder 312 may be built into a system-on-a-chip of image capturing device 300.

According to some aspects, LECI frames generated by embedded low-power processor 304 may be stored in storage module 308. Additionally, image and video data generated by image processor 306 may also be stored in storage module 308. Storage module 308 may be a built-in internal memory that can store a limited number of images and videos. According to some aspects, the storage module 308 may include a removable memory card such as Secure Digital (SD), microSD, CompactFlash (CF), and the like.

According to some aspects, LECI frames generated by the embedded low-power processor 304 are stored in the storage module 308 and may be periodically transmitted to media device 104 and/or uploaded to a cloud storage system of multimedia environment 102. User 132 can download LECIs to review activity in the monitored environment over the corresponding durations of time corresponding to the LECI frames. According to some aspects, image-capturing device may transmit image and video data to media device 104 and/or the cloud storage system for generation of the LECI frames.

According to some aspects, when the image-capturing device 300 is power-constrained (e.g., low power state, sleep state, low battery), image-capturing device 300 may not upload LECI frames to the cloud. Instead, image capturing device 300 may provide an interface for direct access of the LECIs from the storage module 308 over a local network (e.g., user WiFi network). According to some aspects, when the image-capturing device 300 is not power-constrained, image-capturing device 300 may capture a video of the monitored environment over a duration of time, and upload the video data to media device 104 and/or a cloud storage system of multimedia environment 102. According to some aspects, a LECI generation module 136 may generate one or more LECIs corresponding to the video data. The cloud storage system of multimedia environment 102 may transmit the LECI frames to media system(s) 102 which may provide an interface for reviewing the LECIs and determining the corresponding activity in the monitored environment over the corresponding durations of time.

As noted above, optical sensor 302 captures a sequence of image frames at a predetermined frame rate over a duration of time, and the embedded low-power processor 304 or the image processor 306 combines the sequence of images to generate an LECI frame. According to some aspects, the frame rate at which the image frames are captured by the optical sensor 302 may be predetermined based on a measure of activity in the monitored environment. When monitoring a dynamic environment with a large amount of activity, optical sensor 302 of the image-capturing device 300 may be configured to record image frames at a higher frame rate to ensure that the sequence of captured image frames captures a sufficient amount of motion. Alternatively, optical sensor 302 of the image-capturing device 300 may be configured to record image frames at a lower frame rate when monitoring an environment with a low amount of activity to ensure that the sequence of captured image frames captures a sufficient amount of motion. Image capturing device 300 may be configured with software to perform motion detection across the sequence of captured image frames.

According to some aspects, image-capturing device 300 may quantify a measure of activity in the monitored environment based on comparing two or more of the captured images. For example, image processor 306 of image-capturing device 300 may be configured to quantify activity in the monitored environment using techniques such as optical flow method, motion histogram, average displacement vector, mean squared error technique, and the like.

According to some aspects, when image-capturing device 300 determines that a measure of activity corresponding to the monitored environment exceeds a predetermined activity threshold, optical sensor 302 may be configured to capture the image frames at a first predetermined rate. Similarly, when image-capturing device 300 determines that the measure of activity is below the predetermined activity threshold, optical sensor 302 may be configured to capture the image frames at second predetermined rate that is lower than the first predetermined rate. That is the first determined rate (e.g., more than 30 image frames per minute) may be higher than the second predetermined rate (e.g., less than or equal to 30 image frames per minute).

As noted above, each LECI frame provides a single-image visual summary of activity in a monitored environment over a duration of time. In some aspects, image capturing device 300 is recording images of the monitored environment in a fixed position such that the single-image visual summary of activity represents a summary of the activity of the monitored environment from a single view. According to some aspects, the duration of time corresponding to each LECI frame (i.e., the period of activity summarized by each LECI frame) may be varied based on a measure of activity in the monitored environment and/or based on selectable user options. In some aspects, the duration of time corresponding to each LECI frame may determine the rate at which the LECI frames are generated by the image-capturing device 300. For example, the rate at which LECI frames are generated may be varied based on a measure of activity in the monitored environment.

According to some aspects, image-capturing device 300 may determine it is monitoring a dynamic environment with a large amount of activity. Image capturing device 300 may be configured to generate LECI frames that correspond to a shorter duration of time. Such a function may ensure that each LECI frame provides an uncluttered summary of activity over the respective duration of time. Furthermore, when monitoring an environment with a low amount of activity, generating LECI frames that correspond to a longer duration of time may be sufficient to ensure an uncluttered summary of activity by each LECI frame over the respective duration of time.

According to some aspects, when image-capturing device 300 determines that a measure of activity corresponding to the monitored environment exceeds a predetermined activity threshold, embedded low-power processor 304 may be configured to generate LECI frames that correspond to a shorter duration of time (e.g., each LECI frame summarizing less than 4 minutes of activity) than when the measure of activity is less than the predetermined activity threshold. Similarly, when image-capturing device 300 determines that a measure of activity corresponding to the monitored environment falls below a predetermined activity-threshold, embedded low-power processor 304 may be configured to generate LECI framess that correspond to a longer duration of time (e.g., each LECI frame summarizing more than 4 minutes of activity).

Figure 4A:
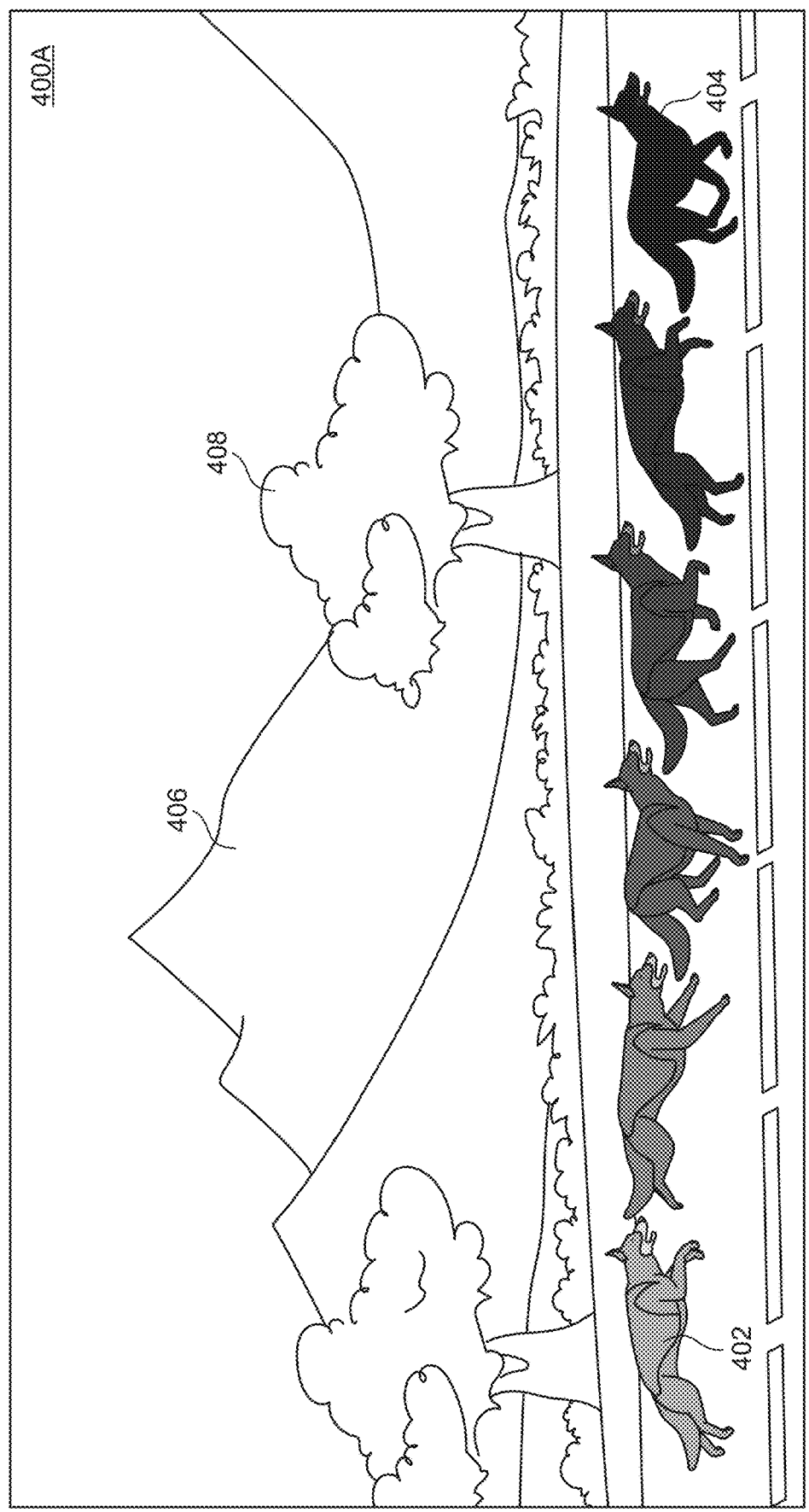
FIG. 4A illustrates an exemplary LECI frame, according to some embodiments.

FIG. 4A illustrates an exemplary long exposure composite image (LECI), according to some aspects of this disclosure. The example LECI frame 400A of FIG. 4A provides a single-image visual summary of a dog running across a predominantly static background (e.g., mountains 406 and trees 408) over a period of time.

As noted above, the embedded low-power processor 304 and/or the image processor 306 may generate the example LECI frame by combining a sequence of image frames that are captured by the optical sensor 302. According to some aspects, to generate a LECI frame, the embedded low-power processor 304 first aligns the sequence of image frames captured by optical sensor 302 before combining them to generate the LECI frame. According to some aspects, the sequence of image frames may be combined using pixel-wise weighted averaging and/or stacking methods. Furthermore, the sequence of image frames comprises a set of image frames captured in succession over a period of time. The weighted averaging may be performed over a subset, or over all, of the image frames of the sequence of image frames.

According to some aspects, computing the pixel-wise weighted average of a set of image frames may involve computing a weighted average pixel value for each pixel location over all image frames of the set of image frames. According to some aspects, optical sensor 302 may capture image frames in an RGB format comprising red, green, and blue channels. Computing the weighted average of a set of RGB image frames may involve computing a pixel-wise weighted average for each color channel.

According to some aspects, optical sensor 302 may capture image frames in a format that indicates the luminance and chrominance values of each pixel (e.g., YUV, YCbCr, etc.). Computing the weighted average of such image frames may involve computing a pixel-wise weighted average of luminance values across a set of image frames while ignoring the chrominance value. Alternatively or in addition, computing the weighted average of image frames may involve computing a pixel-wise weighted average of chrominance values across the set of image frames.

According to some aspects, when computing the weighted average of a sequence of image frames, embedded low-power processor 304 may select the weights assigned to the pixels to accentuate one or more moving objects in the monitored environment. Alternately, or in addition, image processor 306 may generate a LECI frame by computing the weighted average of the sequence of image frames. According to some aspects, the embedded low-power processor 304 and/or the image processor 306 may determine that they lack sufficient processing power and/or electrical power (i.e., due to a low battery) to generate a LECI frame and, instead may transmit the sequence of image frames to media device 106.

In such a case, the media device 106 may receive the sequence of image frames and generate a LECI frame by computing the weighted average of the sequence of image frames. In some aspects, steps for generating a LECI frame may be performed by embedded low-power processor 304; in some aspects, the steps may be distributed between different devices such as one or more of the embedded low-power processor, media device 106, content server(s) 120, and system server(s) 126.

According to some aspects, the LECI frame may be generated with annotations to represent actions performed by the one or more moving objects. For example, when performing pixel-wise weighted averaging across a sequence of image frames, newer pixels may be assigned higher weights compared to older pixels to obtain a streak effect in the direction of motion in the LECI frame. According to some aspects, when combining a sequence of image frames to generate a LECI frame, pixel colors may be modified according to the pixel age such that newer image frames of the sequence may have a color and/or a shade of color that is different from older image frames. According to some aspects, when combining a sequence of image frames to generate a LECI frame, pixel colors may be modified to create a heat map of activity in the LECI frame. According to some aspects, creating a LECI frame that displays a heat map of activity may involve maintaining pixel-change histograms to indicate regions where the most motion has occurred and making them a different color (e.g., using shades of red for high activity areas).

According to some aspects, the example LECI frame 400A of FIG. 4A may be generated by the embedded low-power processor 304 and/or the image processor 306 by assigning higher weights to newer image frames and lower weights to older image frames when computing the weighted average of a sequence of image frames. Accordingly, the example LECI frame of FIG. 4A illustrates a dog running across a static background, from left to right, with an annotation in the form of a streak effect. The LECI frame of FIG. 4A shows object 404 annotated differently (i.e., having a darker shade) than objects 402A-E. In some aspects, the annotation may indicate the object in the LECI frame that corresponds to objects from the most recent image frame in the sequence of image frames that were averaged to generate the LECI frame. Furthermore, the LECI frame of FIG. 4A shows objects 402A-E with varying annotations (i.e., having a lighter shade) to indicate that objects 402A-E correspond to objects from older image frames in the sequence of image frames. In some aspects, object 402A, object 402B, object 402C, object 402D, and object 402E may be annotated differently (as shown in FIG. 4A) to indicate a time progression of objects corresponding to older image frames. For example, object 402A may correspond to the oldest image frame, object 402B may correspond to the next oldest image frame, and so on.

In some aspects, other annotations to LECI image frame 400A are possible. For example, blur effects, added indicators, such as arrows, and/or heat map indications may be added to LECI image frame 400A. Annotations may also be based on time information from the image frames within the sequence of image frames. Once embedded low-power processor 304 and/or the image processor 306 detect and identify moving objects, such as based on changes in pixels from older to newer image frames, from image frames within the sequence of image frames, embedded low-power processor 304 and/or the image processor 306 may blur the older objects, add arrows oriented and pointing in the direction from the older objects to the newer objects, and/or heat maps to indicate a time period where the detected objects did not move.

Figure 4B:
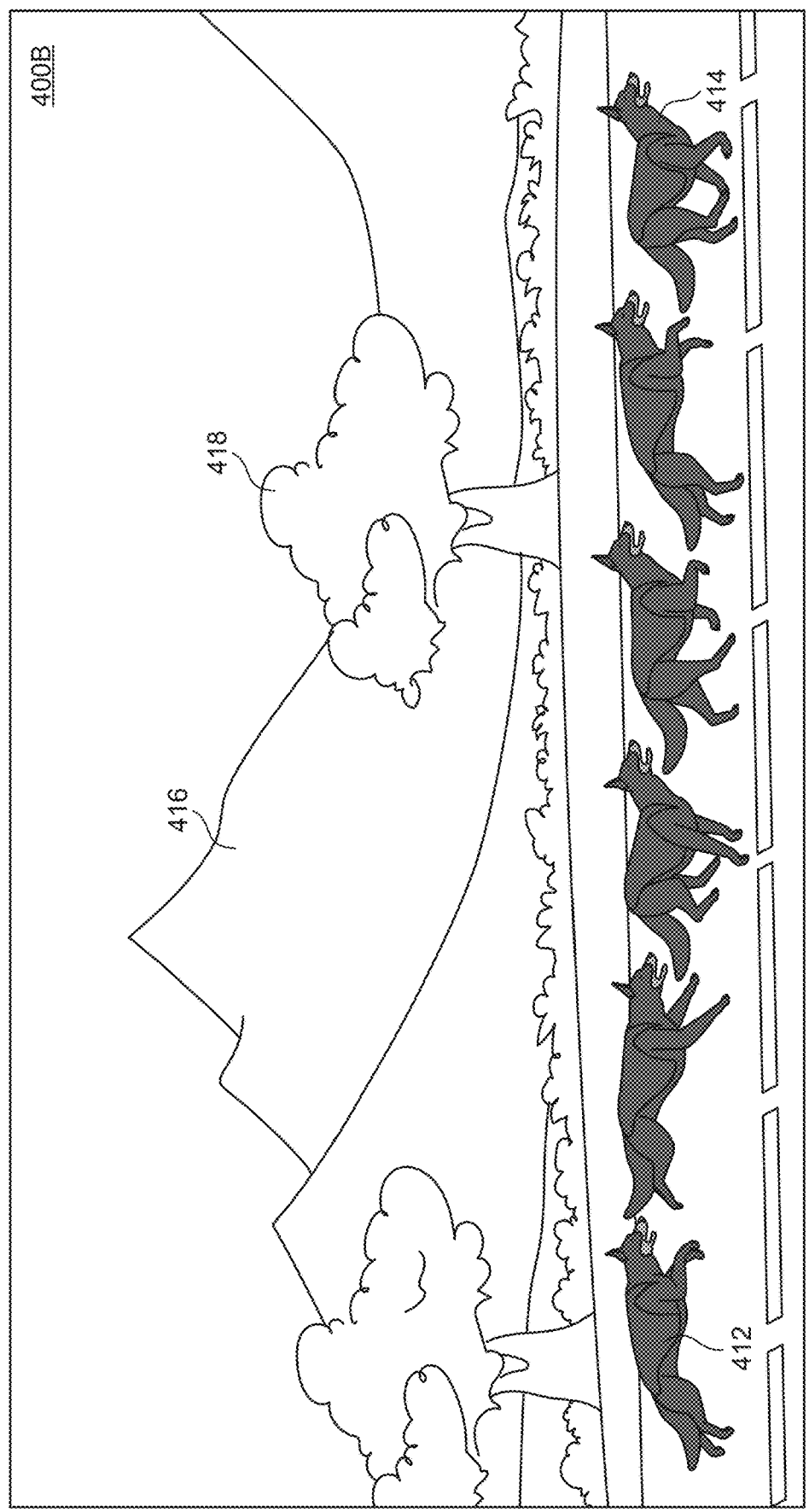
FIG. 4B illustrates another exemplary LECI frame, according to some embodiments.

FIG. 4B illustrates another exemplary long exposure composite image (LECI) frame, according to some aspects of this disclosure. FIG. 4B illustrates an example LECI frame 400B that is generated by the embedded low-power processor 304 and/or the image processor 306 by performing moving object detection on a sequence of image frames and computing pixel-wise weighted average over the set of images by assigning higher weights to pixels corresponding to one or more moving objects (e.g., the running dog in FIG. 4B) in the sequence of images. Similar to the example LECI frame of FIG. 4A, the example LECI frame 400B of FIG. 4B also provides a single-image visual summary of a dog running across a predominantly static background over a period of time (e.g., mountains 416 and trees 418).

According to some aspects, moving object detection involves identifying and tracking objects that are in motion across a sequence of image frames. Moving object detection may be performed using techniques such as background subtraction, frame differencing, and the like. According to some aspects, the embedded low-power processor 304 implementing a background subtraction method first creates a model of a static background using one or more image frames that are static (i.e., with no moving objects), and moving objects are detected by subtracting the background from one or more subsequent image frames. According to some aspects, the embedded low-power processor 304 implementing a frame differencing method computes the absolute or relative difference between pixel values of corresponding pixels in two or more consecutive image frames to identify regions where pixel values have changed significantly, and the regions of image frames where pixel values have changed indicate moving objects. According to some aspects, embedded low-power processor 304 may compute motion vectors to indicate the motion of pixels between consecutive image frames in the sequence of image frames. According to some aspects, embedded low-power processor 304 may compute the motion vectors using optical flow methods that estimate the apparent displacement of pixels to create vectors that in indicate the direction of moving objects.

According to some aspects, once the moving objects in the sequence of image frames are identified, the embedded low-power processor 304 generates a LECI frame by computing the weighted average of a sequence of image frames. According to some aspects, when computing the weighted average of a sequence of image frames, the weights assigned to the pixels may be selected to accentuate one or more moving objects in the sequence of image frames. For example, when performing pixel-wise weighted averaging across a sequence of image frames, pixels corresponding to the moving objects may be assigned higher weights compared to the pixels corresponding to the static background.

According to some aspects, the example LECI frame 400B of FIG. 4B may be generated by the embedded low-power processor 304 and/or the image processor 306 by assigning higher weights to pixels corresponding to moving objects (i.e., the running dog) and lower weights to pixels corresponding to the static background and computing the weighted average of a sequence of image frames. Accordingly, in the LECI frame of FIG. 4B, the images of the object (e.g., objects 412A-F) have a different annotation (i.e., having a darker shade) than the static background (i.e., the background hills and trees). Other types of annotations may be used to differentiate between a moving object and static objects including highlighting, text annotation, and colorization.

Figure 5:
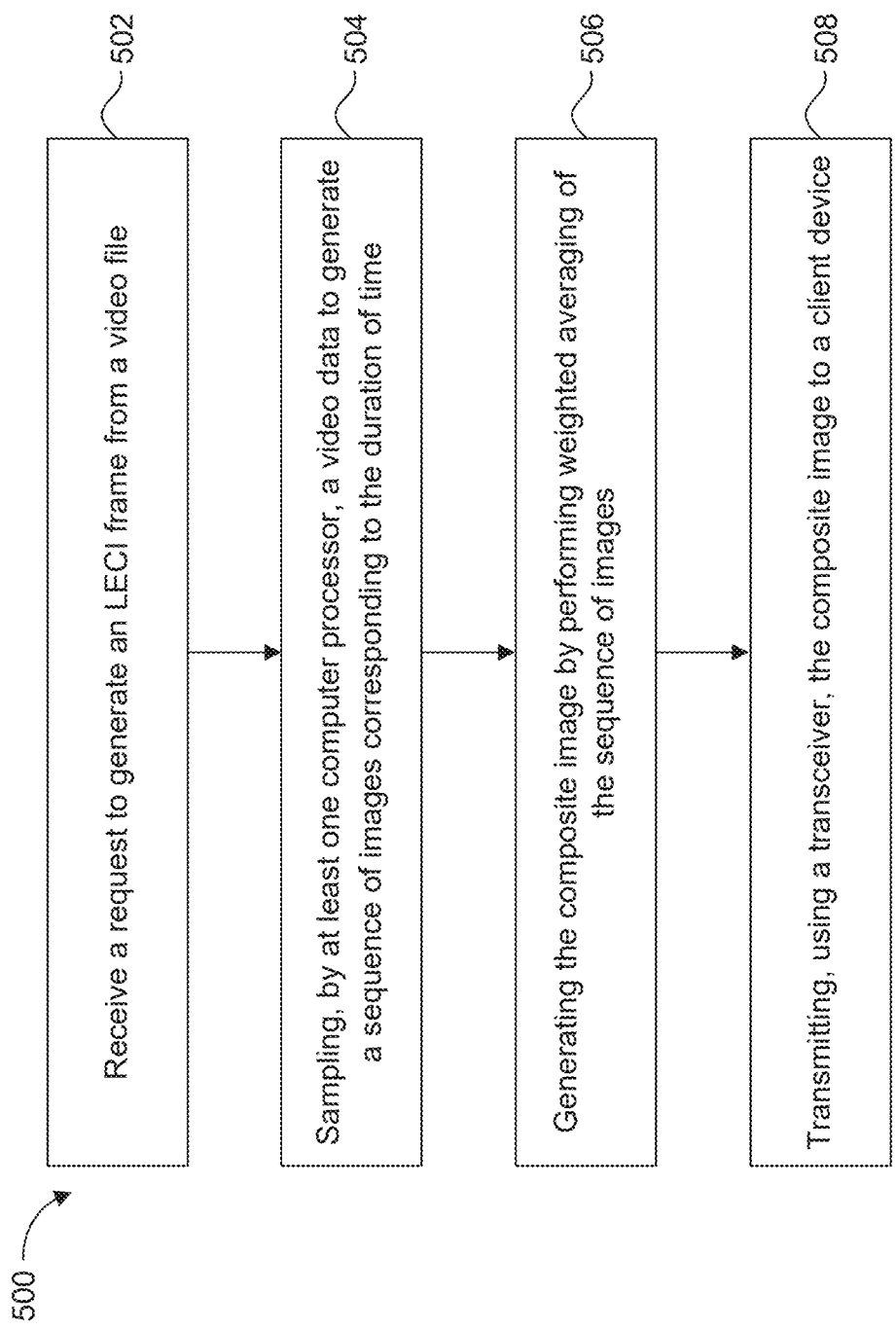
FIG. 5 illustrates a flow diagram of a method for generating LECI frames from stored video data, according to some embodiments.

FIG. 5 is a flow diagram for a method 500 for generating long exposure composite image (LECI) frames from stored video data, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall first be described with reference to the embodiment of LECI generation module 136 depicted in FIG. 1, although method 500 is not limited to that embodiment.

In 502, LECI generation module 136 receives a request (e.g., from user 132) to generate a LECI frame from a video file (e.g., an earlier-recorded video). As noted above, each LECI frame provides a single-image visual summary of activity that occurred over a duration of time. Accordingly, reviewing a LECI frame corresponding to a video segment of a video recording provides a quick and efficient approach to identify activity that may have occurred over the duration of the video segment.

In 504, the LECI generation module 136 samples a segment of the video file at a predetermined rate to generate a sequence of image frames. According to some aspects, the image-capturing device 300 may generate the video data (i.e., video file). When the image-capturing device 300 is not power-constrained, image-capturing device 300 may capture a video (e.g., video at a high frame rate) of the monitored environment, over a duration of time, and upload the video data (i.e., video file) to media device 104, content server 120, and/or a cloud storage system of multimedia environment 102. According to some aspects, the video file may be an earlier recorded video footage stored on the content server 120. According to some aspects, the video file may be an earlier recorded video footage stored on a device of the media system 104 and/or the storage module 308 of the image-capturing device 300. Alternatively, or in addition, the video file may be an earlier recorded video footage stored on cloud storage system of multimedia environment 102.

According to some aspects, LECI generation module 136 may be configured to sample the video file at a rate based on an amount of activity in the video. According to some aspects, LECI generation module 136 may be configured to quantify activity in the video using techniques such as motion detection, feature extraction, optical flow analysis, machine learning, and the like. The LECI generation module 136 may be configured to sample the video at a rate proportional to the amount of activity in the video.

According to some aspects, LECI generation module 136 determines that a measure of activity corresponding to the video exceeds a predetermined activity threshold, it samples the video to generate image frames at a first predetermined rate. Similarly, when LECI generation module 136 determines that the measure of activity in is below the predetermined activity threshold, LECI generation module 136 may be configured to sample the video to generate image frames at second predetermined rate that is lower than the first predetermined rate. That is the first determined rate may be higher than the second predetermined rate. According to some aspects, the duration of the video segment corresponding to each LECI frame (i.e., the period of activity summarized by each LECI frame) may be varied based on a measure of activity in the video and/or based on selectable user options. In some aspects, the LECI generation module 136 may be configured to vary the period of activity summarized by each LECI frame based on a measure of activity in video.

In 504, the LECI generation module generates a LECI frame by combining the sequence of image frames. According to some aspects, LECI generation module 136 may generate the LECI frame by computing the weighted average of the sequence of image frames.

According to some aspects, when computing the weighted average of a sequence of image frames, the LECI generation module 136 may select the weights assigned to the pixels may be selected to accentuate one or more moving objects in the monitored environment. For example, when performing pixel-wise weighted averaging across a sequence of image frames, the LECI generation module 136 assigns newer pixels (i.e., pixels corresponding to later sampled image frames) higher weights compared to older pixels (i.e., pixels corresponding to earlier sampled image frames) to obtain a streak effect in the direction of motion in the LECI frame. Alternatively, or in addition, when combining a sequence of image frames to generate a LECI frame, the LECI generation module 136 may modify the pixel colors according to the pixel age such that later image frames of the sequence may have a color and/or a shade of color that is different from earlier image frames. According to some aspects, when combining a sequence of image frames to generate a LECI frame, the LECI generation module 136 may modify the pixel colors to create a heat map of activity in the LECI frame. According to some aspects, creating a LECI frame that displays a heat map of activity may involve maintaining pixel-change histograms to indicate regions where the most motion has occurred and making them a different color (e.g., using shades of red for high activity areas).

According to some aspects, the LECI generation module 136 may generate a LECI frame by performing moving object detection on a sequence of image frames and computing pixel-wise weighted average over the set of images by assigning higher weights to pixels corresponding to one or more moving objects (e.g., the running dog in FIG. 4B). According to some aspects, the LECI generation module 136 may identify moving objects in a sequence of image frames and generates a LECI frame by computing the weighted average of a sequence of image frames. When computing the weighted average of a sequence of image frames, the LECI generation module 136 may assign weights to the pixels to accentuate one or more moving objects in the sequence of image frames. For example, when performing pixel-wise weighted averaging across a sequence of image frames, the the LECI generation module 136 assigns higher weights to pixels corresponding to the moving objects compared to the pixels corresponding to the static background.

In 506, the LECI generation module 136 sends the LECI frame to a network device. For example, the LECI generation module 136 may send the LECI frames to media device 106. The media device 106 may display an interface for reviewing the received LECI frames. User 132 may review the LECI frame using the interface of media device 106 to identify activity that may have occurred in the video.

Figure 6:
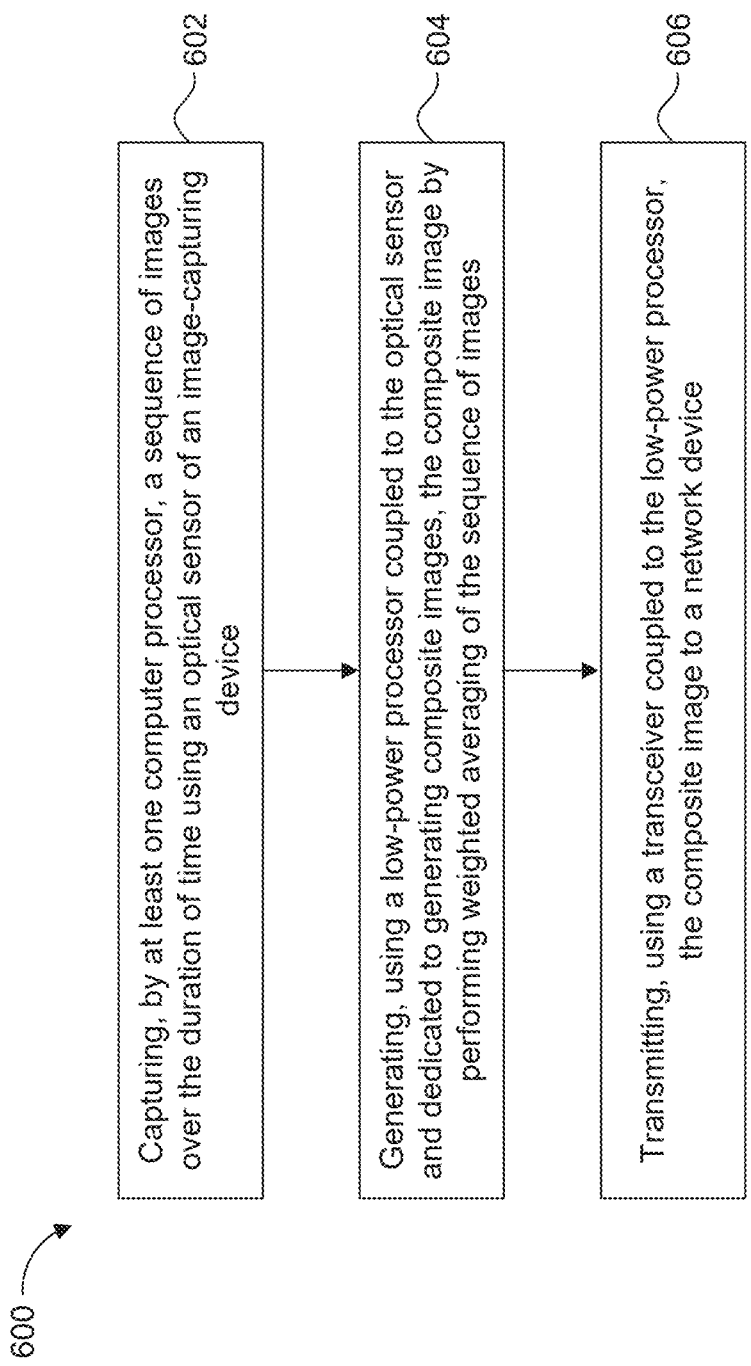
FIG. 6 illustrates a flow diagram of a method for generating LECI frames from a sequence of image frames, according to some embodiments.

FIG. 6 is a flow diagram for a method 600 for generating long exposure composite image (LECI) frames from a sequence of image frames, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall first be described with reference to the embodiment of image-capturing device 300 depicted in FIG. 3, although method 600 is not limited to that embodiment.

In 602, image-capturing device 300 captures a sequence of image frames over the duration of time. According to some aspects, the sequence of images is captured using an optical sensor 302 of the image-capturing device 300. According to some aspects, optical sensor 302 generates uncompressed raw pixel data corresponding to a captured image and/or video. Optical sensor 302 may capture color information by using a pattern of red, green, and blue (RGB) filters over the pixels. Alternately, or in addition, optical sensor 302 may capture luminance (Y) and chrominance (UV) components of the pixels. The uncompressed raw pixel data generated by the optical sensor 302 may be sent to the embedded low-power processor 304 and/or image processor 306 for further processing (e.g., quantization and compression).

According to some aspects, optical sensor 302 captures a sequence of image frames at a predetermined frame rate over a duration of time. According to some aspects, the frame rate at which the optical sensor 302 captures the image frames may be predetermined based on a measure of activity in the monitored environment. When monitoring a dynamic environment with a large amount of activity, optical sensor may be configured to record image frames at a higher frame rate to ensure that the sequence of captured image frames captures a sufficient amount of motion. Alternatively, optical sensor 302 may be configured to record image frames at a lower frame rate when monitoring an environment with a low amount of activity. Furthermore, image-capturing device 300 may be configured with software to perform motion detection across the sequence of captured image frames.

According to some aspects, image-capturing device 300 may quantify a measure of activity in the monitored environment based on comparing two or more of the captured images. For example, image capturing device 300 may quantify activity in the monitored environment may be quantified using techniques such as optical flow method, motion histogram, average displacement vector, mean squared error technique, and the like.

According to some aspects, image-capturing device 300 captures the sequences of image frames at a capture-rate that is proportional to a measure of activity in the monitored environment. Furthermore, image-capturing device 300 may capture the sequence of image frames over a duration that may be inversely proportional to a measure of activity in the monitored environment. When image-capturing device 300 determines that a measure of activity corresponding to the monitored environment exceeds a predetermined activity threshold, optical sensor 302 may be configured to capture the image frames at a first predetermined rate. Similarly, when image-capturing device 300 determines that the measure of activity is below the predetermined activity threshold, optical sensor 302 may be configured to capture the image frames at second predetermined rate that is lower than the first predetermined rate. That is the first determined rate may be higher than the second predetermined rate.

In 604, image-capturing device 300 generates the LECI frame by combining the sequence of image frames. According to some aspects an embedded low-power processor 304 coupled to optical sensor 302 generates and LECI frame by combining the sequence of image frames. Alternatively, or in addition, image processor 306 of the image-capturing device 300 may generate a LECI frame by combining the sequence of image frames. According to some aspects, embedded low-power processor 304 and/or the image processor 306 may generated the LECI frame by computing the weighted average of the sequence of image frames.

According to some aspects, when computing the weighted average of a sequence of image frames, the embedded low-power processor 304 may select the weights assigned to the pixels may be selected to accentuate one or more moving objects in the monitored environment. For example, when performing pixel-wise weighted averaging across a sequence of image frames, the embedded low-power processor 304 assigns newer pixels higher weights compared to older pixels to obtain a streak effect in the direction of motion in the LECI frame. Alternatively, or in addition, when combining a sequence of image frames to generate a LECI frame, the embedded low-power processor 304 may modify the pixel colors according to the pixel age such that newer image frames of the sequence may have a color and/or a shade of color that is different from older image frames. According to some aspects, when combining a sequence of image frames to generate a LECI frame, the embedded low-power processor 304 may modify the pixel colors to create a heat map of activity in the LECI frame. According to some aspects, creating a LECI frame that displays a heat map of activity may involve maintaining pixel-change histograms to indicate regions where the most motion has occurred and making them a different color (e.g., using shades of red for high activity areas).

According to some aspects, the embedded low-power processor 304 and/or the image processor 306 may generate a LECI frame by performing moving object detection on a sequence of image frames and computing pixel-wise weighted average over the set of images by assigning higher weights to pixels corresponding to one or more moving objects (e.g., the running dog in FIG. 4B). According to some aspects, the embedded low-power processor 304 may identify moving objects in a sequence of image frames and generates a LECI frame by computing the weighted average of a sequence of image frames. When computing the weighted average of a sequence of image frames, the embedded low-power processor 304 may assign weights to the pixels to accentuate one or more moving objects in the sequence of image frames. For example, when performing pixel-wise weighted averaging across a sequence of image frames, the embedded low-power processor 304 assigns higher weights to pixels corresponding to the moving objects compared to the pixels corresponding to the static background.

In 606, the image-capturing device 300 transmits, using a transceiver coupled to the embedded low-power processor, the LECI frame to a network device. According to some aspects, the network device may be media device 106 of the media system 104, content server 120, and/or a cloud-based storage device. According to some aspects, the image-capturing device 300 may store the LECI frames generated by the embedded low-power processor 304 in storage module 308 and may be periodically transmitted to media device 104 and/or uploaded to a cloud storage system of multimedia environment 102.

According to some aspects, when the image-capturing device 300 is power-constrained (e.g., low power state, sleep state, or low battery), image-capturing device 300 may not upload LECI frames to the cloud. Instead, image-capturing device 300 may provide an interface for direct access of the LECIs from the storage module 308 over a local network (e.g., user WiFi network). Alternatively, when the image-capturing device 300 is not power-constrained, image-capturing device 300 may capture a video of the monitored environment over a duration of time, and upload the video data to media device 104 and/or a cloud storage system of multimedia environment 102. From the uploaded video data, a cloud-based processing module may generate one or more LECIs corresponding to multiple durations of time.

Figure 7:
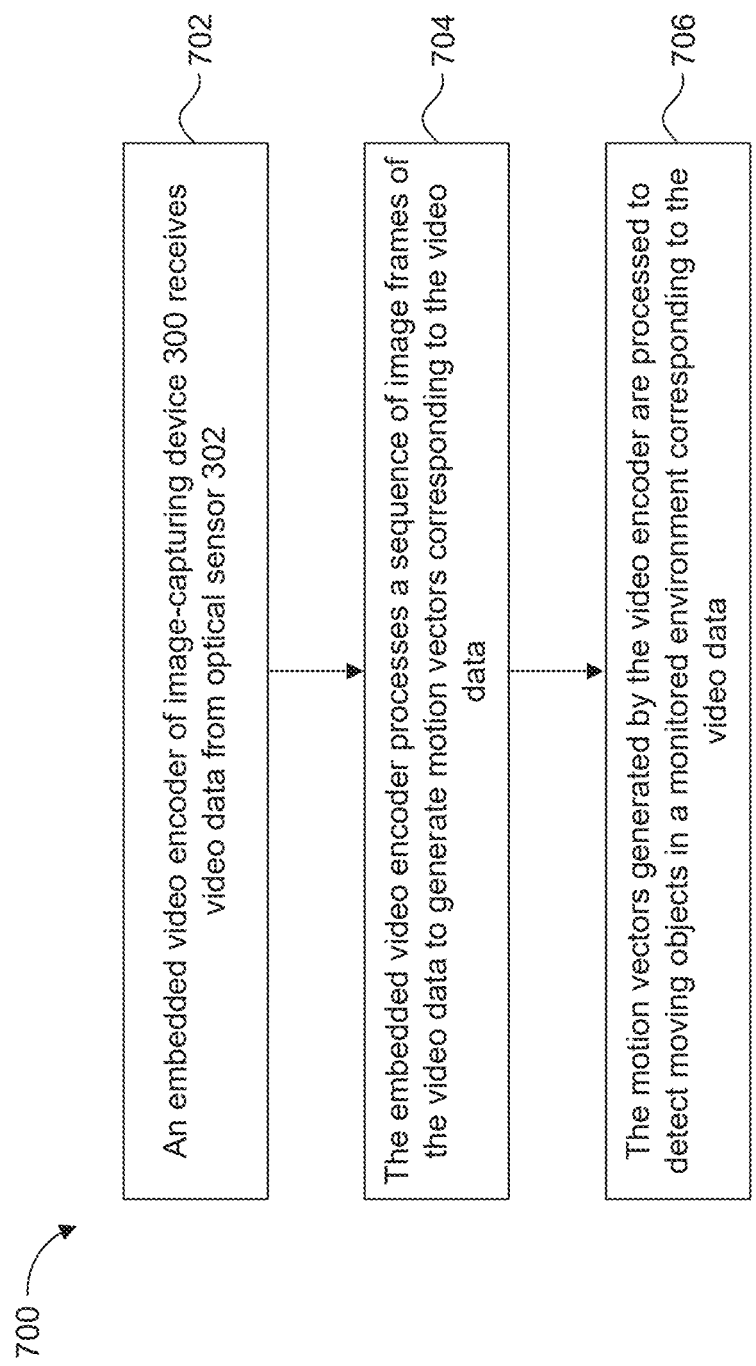
FIG. 7 illustrates a flow diagram of a method for identifying the movement of large objects between frames of video data, according to some embodiments.

FIG. 7 is a flow diagram for a method 700 for identifying the movement of large objects between frames of video data, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall first be described with reference to the embodiment of video encoder 312 and central processor 314 depicted in FIG. 3, although method 700 is not limited to that embodiment.

At 702, video encoder 312 of image-capturing device 300 receives video data from optical sensor 302. Video encoder 312 may be embedded on a system on chip (SoC) of image capturing device 300. Video encoder 312 may be configured to receive raw video data from optical sensor 302 and convert it into a digital format that can be streamed, recorded, or transmitted over a network. According to some aspects, video encoder 312 may be configured to compress video data using compression standards such as H.264, H.265 (HEVC), and VP9.

At 704, video encoder 312 processes a sequence of video frames (e.g., image frames) of the video data to generate a compressed bitstream that includes clusters of motion vectors corresponding to one or more identified movement patterns in the video data. According to some aspects, compared to central processor 314, video encoder 312 may consume lower power to perform certain video processing operations (e.g., generating motion vectors). According to some aspects, to improve power efficiency, video encoder 312 may be configured to process a sequence of image frames of the video data to generate motion vectors.

According to some aspects, motion vectors may be generated by comparing consecutive video frames in a sequence of video frames. According to some aspects, video encoder 312 may compute the motion vectors using optical flow methods that estimate the apparent displacement of pixels to create vectors that indicate the direction of moving objects. According to some aspects, motion vectors may be generated using a block-matching algorithm. According to some aspects, the motion vectors in the compressed video data generated by video encoder 312 may be scanned by low-power central processor 312 to identify the movement of large objects between frames of video data.

At 706, motion vectors generated by the video encoder 312 are processed to detect moving objects in a monitored environment corresponding to the video data. Accordingly, large objects in motion in the video data may be identified in a power-efficient manner by using the on-chip video encoder 312 to compare consecutive video frames and scanning the resulting motion vectors using central processor 312. According to some aspects, a low-power central processor 314 may identify the large objects in motion by performing motion vector clustering to group motion vectors that may correspond to movements of large objects within a video sequence. In some aspects, the motion vectors may be visualized (e.g., as arrows indicating the direction of movement) on the video data. Central processor 314 may use clustering algorithms such as k-means clustering, hierarchical clustering, and density-based spatial clustering to cluster motion vectors.

Example Computer System

Various embodiments may be implemented, for example, using one or more well-known computer systems, such as computer system 700 shown in FIG. 7. For example, the media device 106 may be implemented using combinations or sub-combinations of computer system 700. Also or alternatively, one or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700 or processor(s) 704), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for generating a long exposure composite image (LECI) frame, wherein the LECI frame provides a summary of activity in a monitored environment over a duration of time, comprising:
   capturing, by at least one computer processor of an image-capturing device, a sequence of image frames over the duration of time using an optical sensor of the image-capturing device;
   generating, using an embedded low-power processor coupled to the optical sensor and dedicated to generating LECI frames, the LECI frame by combining the sequence of image frames; and
   transmitting, using a transceiver coupled to the embedded low-power processor, the LECI frame to a network device.

2. The computer-implemented method of claim 1, wherein the sequence of image frames comprises a first set of image frames and a second set of image frames, wherein the first set of image frames is associated with a first time period within the duration of time and the second set of image frames is associated with a second time period within the duration of time, wherein the first time period is more recent than the second time period, and wherein generating the LECI frame comprises:
   performing a weighted averaging of the sequence of image frames by:
      assigning a first set of weights to the first set of image frames of the sequence of image frames; and
      assigning a second set of weights to the second set of image frames, wherein each of the first set of weights is greater than all of the second set of weights.

3. The computer-implemented method of claim 1, wherein generating the LECI frame comprises:
   combining the sequence of image frames by computing a pixel-wise weighted average of pixel values across the sequence of image frames.

4. The computer-implemented method of claim 1, wherein generating the LECI frame comprises:
   identifying a moving object in one or more image frames of the sequence of image frames; and
   performing the weighted averaging by assigning higher weights to pixels corresponding to the moving object in the one or more image frames.

5. The computer-implemented method of claim 1, wherein generating the LECI frame comprises:
   identifying relative displacement of one or more pixels between a set of image frames of the sequence of image frames to generate one or more direction vectors indicating direction of motion of an object in the sequence of image frames.

6. The computer-implemented method of claim 1, wherein capturing the sequence of image frames comprises:
   capturing the sequence of image frames at a capture-rate that is proportional to a measure of activity in the monitored environment.

7. The computer-implemented method of claim 1, wherein the duration of time is inversely proportional to a measure of activity in the monitored environment.

8. The computer-implemented method of claim 1, wherein the image-capturing device is a battery-operated camera.

9. A system for generating a long exposure composite image (LECI) frame, wherein the LECI frame provides a summary of activity in a monitored environment over a duration of time, comprising:
   one or more memories; and
   at least one processor coupled to at least one of one or more memories of an image-capturing device and configured to perform operations comprising:
      capturing a sequence of image frames over the duration of time using an optical sensor of the image-capturing device;
      generating, using an embedded low-power processor coupled to the optical sensor and dedicated to generating LECI frames, the LECI frame by combining the sequence of image frames; and
      transmitting, using a transceiver coupled to the embedded low-power processor, the LECI frame to a network device.

10. The system of claim 9, wherein the sequence of image frames comprises a first set of image frames and a second set of image frames, wherein the first set of image frames is associated with a first time period within the duration of time and the second set of image frames is associated with a second time period within the duration of time, wherein the first time period is more recent than the second time period, and wherein generating the LECI frame comprises:
    performing a weighted averaging of the sequence of image frames by:
       assigning a first set of weights to the first set of image frames of the sequence of image frames; and
       assigning a second set of weights to the second set of image frames, wherein each of the first set of weights is greater than all of the second set of weights.

11. The system of claim 9, wherein generating the LECI frame comprises:
    combining the sequence of image frames by computing a pixel-wise weighted average of pixel values across the sequence of image frames.

12. The system of claim 9, wherein generating the LECI frame comprises:
    identifying a moving object in one or more image frames of the sequence of image frames; and
    performing a weighted averaging by assigning higher weights to pixels corresponding to the moving object in the one or more image frames.

13. The system of claim 9, wherein generating the LECI frame comprises:
    identifying relative displacement of one or more pixels between a set of image frames of the sequence of image frames to generate one or more direction vectors indicating direction of motion of an object in the sequence of image frames.

14. The system of claim 9, wherein capturing the sequence of image frames comprises:
    capturing the sequence of image frames at a capture-rate that is proportional to a measure of activity in the monitored environment.

15. The system of claim 9, wherein the duration of time is inversely proportional to a measure of activity in the monitored environment.

16. A non-transitory computer-readable medium having instructions stored thereon that, when executed by at least one computing device, cause the at least one computing device to perform operations for generating a long exposure composite image (LECI) frame, wherein the LECI frame provides a summary of activity in a monitored environment over a duration of time, the operations comprising:
    capturing, by at least one computer processor of an image-capturing device, a sequence of image frames over the duration of time using an optical sensor of the image-capturing device;

generating, using an embedded low-power processor coupled to the optical sensor and dedicated to generating LECI frames, the LECI frame by combining the sequence of image frames; and transmitting, using a transceiver coupled to the embedded low-power processor, the LECI frame to a network device.

17. The non-transitory computer-readable medium of claim 16, wherein the sequence of image frames comprises a first set of image frames and a second set of image frames, wherein the first set of image frames is associated with a first time period within the duration of time and the second set of image frames is associated with a second time period within the duration of time, wherein the first time period is more recent than the second time period, and wherein generating the LECI frame comprises:

performing a weighted averaging of the sequence of image frames by:

assigning a first set of weights to the first set of image frames of the sequence of image frames; and assigning a second set of weights to the second set of image frames, wherein each of the first set of weights is greater than all of the second set of weights.

18. The non-transitory computer-readable medium of claim 16, wherein generating the LECI frame comprises:

combining the sequence of image frames by computing a pixel-wise weighted average of pixel values across the sequence of image frames.

19. The non-transitory computer-readable medium of claim 16, wherein generating the LECI frame comprises:

identifying a moving object in one or more image frames of the sequence of image frames; and performing the weighted averaging by assigning higher weights to pixels corresponding to the moving object in the one or more image frames.

20. The non-transitory computer-readable medium of claim 16, wherein capturing the sequence of image frames comprises:

capturing the sequence of image frames at a capture-rate that is proportional to a measure of activity in the monitored environment.

\* \* \* \* \*